UNITED STATES PATENT OFFICE.

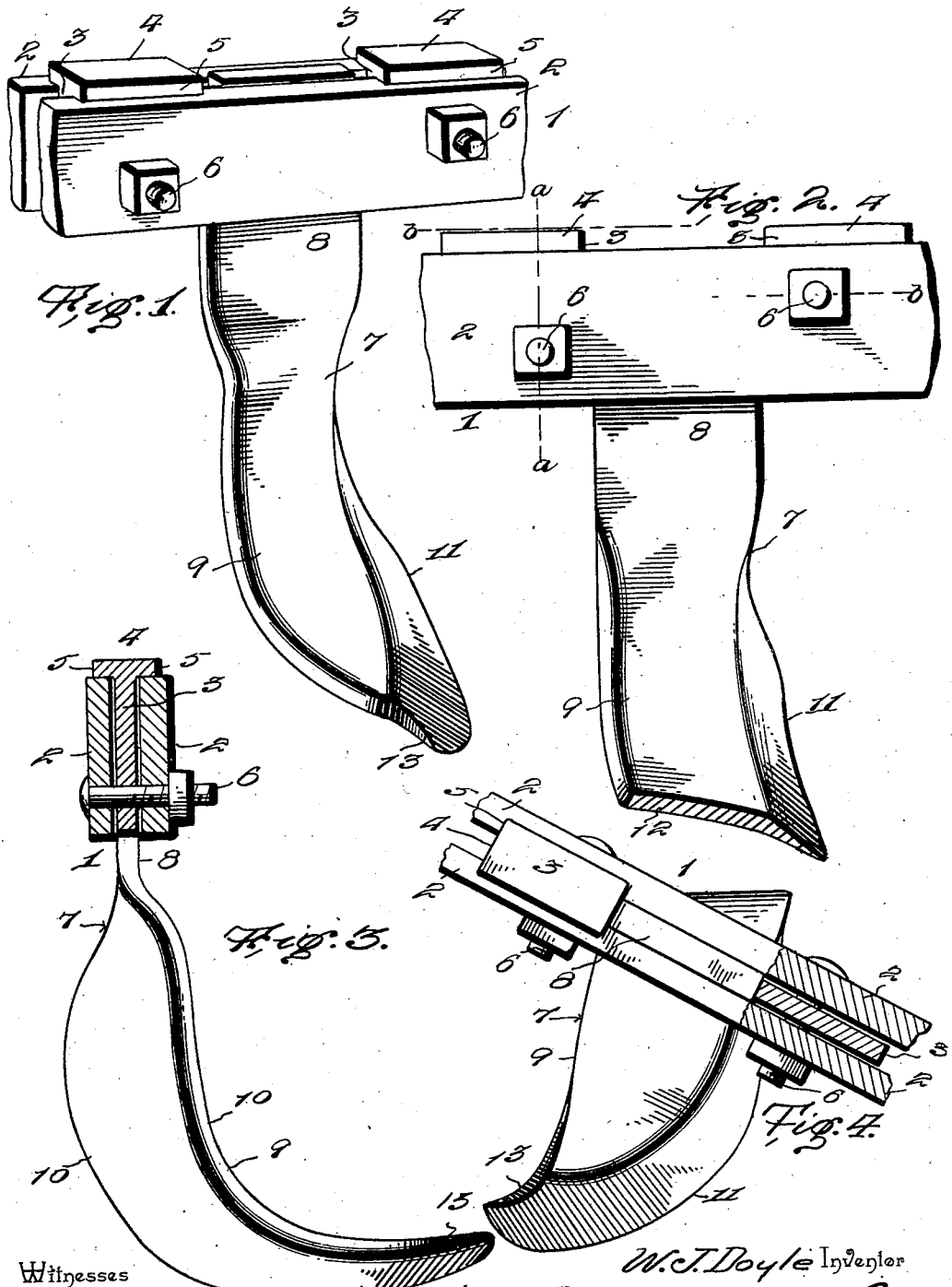

WILLIAM J. DOYLE, OF PENN, NORTH DAKOTA.

HARROW.

SPECIFICATION forming part of Letters Patent No. 711,950, dated October 28, 1902.

Application filed January 2, 1902. Serial No. 88,184. (Model.)

*To all whom it may concern:*

Be it known that I, WILLIAM J. DOYLE, a citizen of the United States, residing at Penn, in the county of Ramsey and State of North Dakota, have invented a new and useful Harrow, of which the following is a specification.

My invention relates to improvements in harrows, particularly with reference to the construction of the teeth, whereby the same are adapted to cut grass, weeds, and brush below the surface, and thereby effectually destroy the same.

In the accompanying drawings, Figure 1 is a perspective view of a portion of a harrow-bar and a harrow-tooth embodying my improvements. Fig. 2 is a side elevation of the same and a section on a plane intersecting the harrow-tooth. Fig. 3 is a transverse sectional view taken on a plane indicated by the line $a\, a$ of Fig. 2. Fig. 4 is partly a top plan view and partly a section taken on a plane indicated by the line $b\, b$ of Fig. 2 and showing clearly the oblique or angular disposition of the cutting-blade of the harrow-tooth with reference to the harrow-bar, to which it is attached.

In the embodiment of my invention I construct each of the harrow-bars 1, to which the teeth are attached, of a pair of separable parallel members 2, between which for each of the harrow-teeth are disposed a pair of space-blocks 3, which have laterally-extended heads 4, the flanges or side projections 5 of which bear on the upper edges of the bar-sections 2. The said space-blocks are connected and secured to the bar-sections by bolts 6, which pass through alined openings in said space-blocks and in the bar-sections.

I employ a harrow-tooth 7 in connection with each pair of the space-blocks. Each harrow-tooth is formed of spring-steel and is provided with an upwardly-extending shank 8, which is flattened on opposite sides and is disposed and secured between the bar-sections 2 and the space-blocks 3, the latter being, respectively, in advance and rear of the tooth-shank. The thickness of the shank 8 of the harrow-tooth is somewhat in excess of that of the space-blocks, so that when the nuts are tightened on the clamping-bolts 6 the shank 8 of the harrow-tooth is firmly clamped between the bar-sections 2. The said space-blocks bear, respectively, against the front and rear sides of the shank of the harrow-tooth and support the latter in a vertical position and sustain the same in said position when the harrow is in operation.

The harrow-tooth is formed with a curved laterally-extending blade 9, the outer portion of which is approximately horizontal and the front side of which blade is of greater radius than the rear side 10 thereof, and in the construction of the harrow-tooth the blade is twisted obliquely with reference to the shank 8. The front edge of the blade is beveled on its upper side and sharpened to form a cutting edge 11. Owing to the fact that the rear edge of the blade is of less radius than the front edge thereof the laterally-extended outer portion of the blade is inclined upwardly and rearwardly in cross-section, as at 12, Fig. 2, and in operation the lower side of the blade is out of contact with the ground, the front cutting edge 11 depending at the front side of the blade, which is concaved on its lower side, as shown, and running in the furrow made by the tooth. Hence the plane of the upper side of the lateral outwardly-extended portion of the tooth is inclined upwardly rearwardly, so that the tooth is caused to cut under the surface of the soil, its tendency being to embed itself therein, and hence the tendency of the stress exerted by the draft to raise the teeth out of the soil is counteracted. The outer lateral extremity of the blade forms a hook 13, and in operation the soil under which the tooth cuts passes rearwardly over the rear edge 10 of the tooth, which rear edge, as hereinbefore stated, is of reduced radius, and over the hook 13.

It will be understood that the action of the harrow-teeth will be such as to cut through the grass, weeds, brush, and other vegetable growth below the surface of the soil, so as to effectually destroy the same, and it will be understood that owing to the lateral extensions of the lower outer ends of the blades of the teeth and the oblique disposition of the harrow beams or bars with reference to the line of draft the space covered by the harrow during one round thereof will be entirely cleared of vegetable growth by the action of the teeth.

Having thus described my invention, I claim—

1. A harrow-tooth comprising a vertical shank passing by an oblique twist into a blade, the upper part of which is in a different plane from the shank, said blade being curved continuously and laterally from the shank to its outer end, the outer portion of the blade being approximately horizontal in a direction transverse to the plane of the shank, being inclined upwardly toward the rear and concaved on its lower side, substantially as described.

2. A harrow-tooth comprising a vertical shank passing by a twist into a blade, the upper part of which is in a different plane from the shank, said blade curved continuously and laterally into a plane approximately horizontal in a direction transverse to the plane of the shank, having a front, sharpened cutting edge, being inclined upwardly toward the rear, and terminating in a rearwardly-curving hook, substantially as described.

In testimony that I claim the foregoing as my own I have hereto affixed my signature in the presence of two witnesses.

WILLIAM J. DOYLE.

Witnesses:
GEORGE DINGMAN,
MINNA SCHULTZ.